United States Patent [19]

Sugimoto et al.

[11] Patent Number: 4,593,366
[45] Date of Patent: Jun. 3, 1986

[54] METHOD OF CONTROLLING ROBOT

[75] Inventors: Koichi Sugimoto, Hiratsuka; Tsugio Sekine, Hasuda, both of Japan

[73] Assignee: Hitachi, Ltd., Tokyo, Japan

[21] Appl. No.: 482,022

[22] Filed: Apr. 4, 1983

[30] Foreign Application Priority Data

Apr. 5, 1982 [JP] Japan ................... 57-55423

[51] Int. Cl.$^4$ ............................................. G06F 15/46
[52] U.S. Cl. .................................. 364/513; 364/169; 318/573
[58] Field of Search ................ 364/513, 169; 318/573, 318/571, 574

[56] References Cited

U.S. PATENT DOCUMENTS

| | | | |
|---|---|---|---|
| 3,798,427 | 3/1974 | Conners | 318/571 |
| 3,864,613 | 2/1975 | Cutler | 318/571 |
| 3,876,873 | 4/1975 | Glawson | 318/571 |
| 3,943,343 | 3/1976 | Irie | 364/513 |
| 4,061,907 | 12/1977 | Okamoto et al. | 318/573 |
| 4,079,235 | 3/1978 | Froyd et al. | 318/573 |
| 4,086,522 | 4/1978 | Engelberger et al. | 364/513 |
| 4,130,788 | 12/1978 | Fiegehen et al. | 318/573 |
| 4,163,184 | 7/1979 | Leenhouts | 318/573 |
| 4,199,814 | 4/1980 | Rapp et al. | 318/573 |
| 4,342,378 | 8/1982 | Hmelovsky | 318/561 |
| 4,348,731 | 9/1982 | Kogawa | 364/513 |
| 4,385,358 | 5/1983 | Ito et al. | 364/513 |
| 4,453,221 | 6/1984 | Davis et al. | 364/513 |

Primary Examiner—Jerry Smith
Assistant Examiner—John R. Lastova
Attorney, Agent, or Firm—Beall Law Offices

[57] ABSTRACT

A method of controlling a robot is disclosed in which the displacement of each of a plurality of kinematic pairs of a robot is detected by a detector, the present spatial position of a hand or tool of the robot is calculated on the basis of the detected displacement of each kinematic pair, a set position to be occupied by the hand or tool and a deviation of the present position of the hand or tool from the set position are calculated, the speed of the hand or tool is determined in accordance with the deviation, a desired displacement value or speed of each of the kinematic pairs is calculated from the speed of the hand, and actuators are controlled on the basis of the calculated displacement values or speeds of the kinematic pairs to drive the kinematic pairs.

18 Claims, 7 Drawing Figures

METHOD OF CONTROLLING ROBOT

BACKGROUND OF THE INVENTION

The present invention relates to a method of controlling a robot in which a hand or tool (hereinafter simply referred to as a "hand") of a robot is driven at a speed corresponding to the deviation from a set position to place the hand accurately at the set position.

A robot has hitherto been controlled in such a manner that acceleration and deceleration are exerted in accordance with predetermined teaching data. In such a control operation, it is impossible to obtain desired acceleration and deceleration curves, since the robot cannot respond immediately to the predetermined data. In order to solve such difficulties, it is required to make gentle respective slopes of acceleration and deceleration curves, and therefore the robot cannot be driven at a high speed.

In more detail, according to a conventional method of controlling a robot, in the case where a hand is moved between two points given by teaching at a predetermined speed along a straight line connecting these two points, the position of the hand at each sampling time is determined by an interpolation method, the position thus determined is converted into the displacement of a kinematic pair, this displacement is outputted as a set value at each sampling time, and a servo system makes positioning control on the basis of these set values. In this case, the acceleration and deceleration of the hand are made by changing the length of intervals used in the interpolation. However, interpolation is made on the basis of only the teaching data, and positional information which is obtained while the hand is moved, is not used in interpolation. Accordingly, even in the case where the motion of the hand is delayed or advanced, set values corresponding to an ideal response are given by interpolation. Therefore, smooth acceleration and deceleration cannot be made, and in the worst case, the hand is moved while vibrating.

SUMMARY OF THE INVENTION

An object of the present invention is to provide a method of controlling a robot which can eliminate the above-mentioned drawbacks of the prior art, and in which a hand is stopped in accordance with a smooth deceleration curve and moreover can be driven at a high speed.

In order to attain the above object, according to the present invention, the speed of a hand is determined on the basis of the deviation of the present position of the hand from a set position, and thus a delay in the movement of a robot is taken into consideration when the hand is decelerated.

In more detail, the speed of the hand is so determined as to be proportional to the above-mentioned deviation or the square root thereof, and the displacement or speed of a kinematic pair is controlled in accordance with the above-mentioned speed of the hand, thereby controlling the robot smoothly or rapidly.

DESCRIPTION OF THE PREFERRED EMBODIMENT

Figure 1:
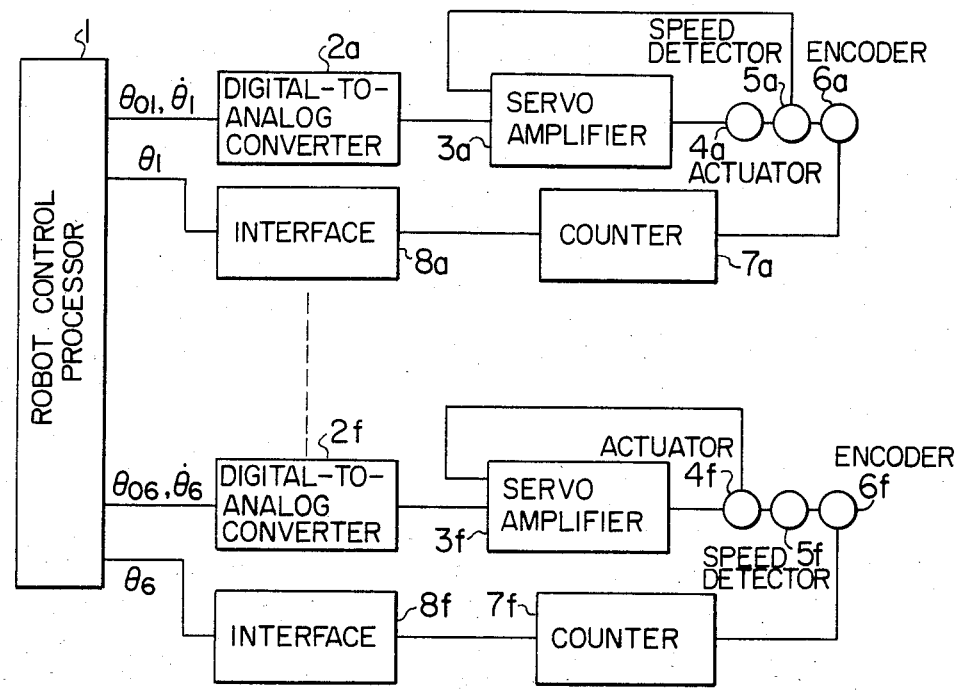
FIG. 1 is a block diagram showing an example of a control device for practising a method of controlling a robot according to the present invention.

Now, an embodiment of the present invention will be explained below in detail, with reference to the drawings. FIG. 1 shows the circuit configuration of a device for practising a method of controlling a robot according to the present invention. In FIG. 1, reference numeral 1 designates a robot control processor, 2a to 2f digital-to-analog converters, 3a to 3f servo amplifiers, 4a to 4f actuators for driving kinematic pairs 9a to 9f making up an articulate robot shown in FIG. 2, 5a to 5f speed detectors attached respectively to the actuators 4a to 4f for detecting the speed of each of the actuators to feed the detected speed back to a corresponding one of the servo amplifiers, 6a to 6f encoders attached respectively to the actuators 4a to 4f, 7a to 7f counters for counting up pulses outputted from each of the encoders 6a to 6f to detect angles $\theta_1$ to $\theta_6$ of rotation of the kinematic pairs 9a to 9f each measured from an origin, 8a to 8f interfaces for supplying the angles $\theta_1$ to $\theta_6$ stored in the counters 7a to 7f to the robot control processor 1.

Figure 2:
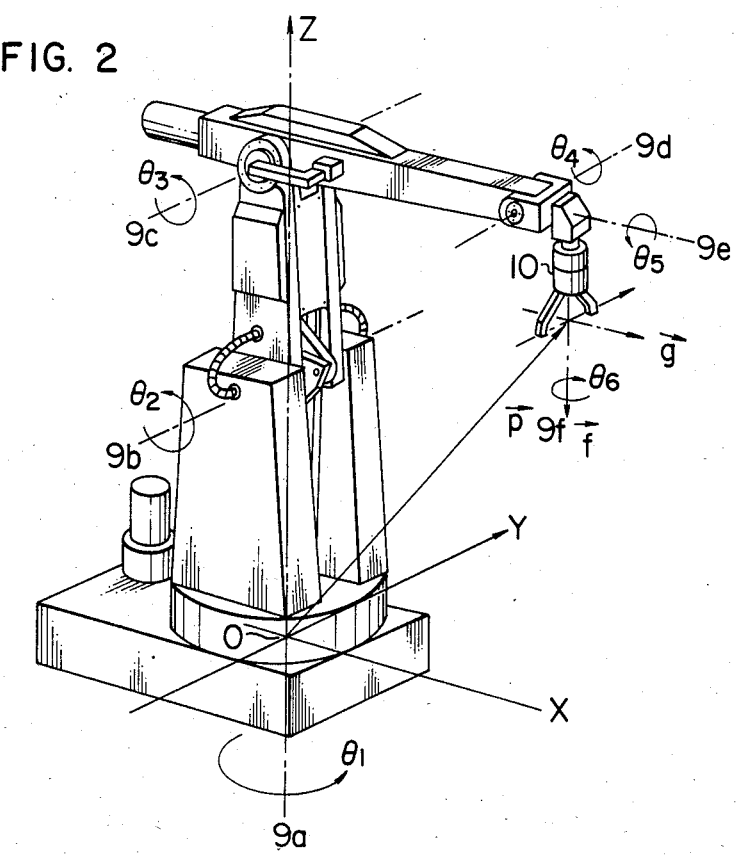
FIG. 2 is a perspective view showing a general structure of a robot.

Referring to FIG. 2, the position and orientation of a hand 10 of a robot can be expressed by, for example, a position vector $\vec{p}$ indicating the position of the hand 10 and two unit vectors $\vec{f}$ and $\vec{g}$ indicating the orientation of the hand 10. The vectors $\vec{f}$ and $\vec{g}$ are made parallel to two axes fixed to the hand 10, and are usually perpendicular to each other. The present position of the hand 10 can be calculated on the basis of the displacement values (namely, the angles of rotation) of the kinematic pairs 9a to 9f read out of the counters 7a to 7f. Now, explanation will be made on a robot having six degrees of freedom. The robot has six kinematic pairs 9a to 9f, and values $\theta_1, \theta_2, \ldots, \theta_6$ of rotational displacement of the kinematic pairs are detected by the encoders 6a to 6f which are attached to the kinematic pairs or actuators 4a to 4f, and the counters 7a to 7f. The present position and orientation of the hand are determined univocally by the displacement values $\theta_1$ to $\theta_6$, and are expressed by the following equations:

$$\vec{p} = \vec{a}_p(\theta_1, \theta_2, \ldots, \theta_6) \tag{1}$$

$$\vec{f} = \vec{a}_f(\theta_1, \theta_2, \ldots, \theta_6) \tag{2}$$

$$\vec{g} = \vec{a}_g(\theta_1, \theta_2, \ldots, \theta_6) \tag{3}$$

When the hand 10 is driven, vectors $\vec{p}_f$, $\vec{f}_f$ and $\vec{g}_f$ indicating a set state are determined for the hand 10, and the hand 10 is moved along a straight line at a specified translational speed $V_{max}$ so as to take the set state. However, if the hand is moved at the speed $V_{max}$ to the last, it will go past a set position, and therefore it is impossible to dispose the hand so that the set state is realized. For this reason, of the differences between the vectors $\vec{p}$, $\vec{f}$ and $\vec{g}$ indicating the present state of the hand and the vectors $\vec{p}_f$, $\vec{f}_f$ and $\vec{g}_f$ indicating the set state, only the difference between the vector $\vec{p}$ indicating the present position and the vector $\vec{p}_f$ indicating the set position is first considered, that is, a deviation e is first determined by the following equation:

$$e = |\vec{p} - \vec{p_f}| \quad (4)$$

Figure 3:
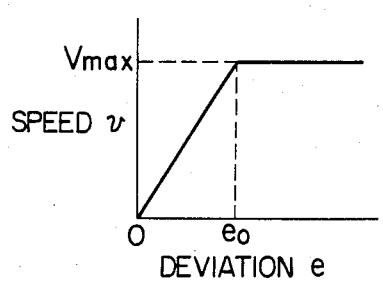
FIGS. 3 and 4 are graphs showing examples of a relation between the deviation of the present position of a hand from a set position and the speed of the hand.
Figure 4:
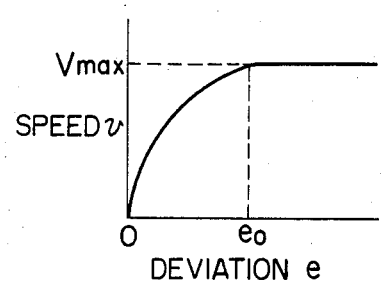

Further, the speed of the hand is made to take the form of a function of the deviation e shown in FIG. 3 or 4.

Referring to FIG. 3, when the deviation e of the hand is less than a value $e_o$, the speed v of the hand is made proportional to the deviation e as indicated by the following equation:

$$v = k_1 e \quad (5)$$

When the deviation e is greater than or equal to the value $e_o$, the speed v is made equal to a value $V_{max}$ as indicated by the following equation:

$$v = V_{max} \quad (6)$$

were the value $k_1$ or $e_o$ is determined by the specified speed $V_{max}$. For example, when the value $k_1$ is constant, the value $e_o$ is given by the following equation:

$$e_o = \frac{V_{max}}{k_1} \quad (7)$$

Referring to FIG. 4, when the deviation e is less than the value $e_o$, the speed v is given by the following equation:

$$v = k_2 \sqrt{e} \quad (8)$$

When the deviation e is greater than or equal to the value $e_o$, the speed v is given by the following equation:

$$v = V_{max} \quad (9)$$

When the value $k_2$ is constant independently of the speed $V_{max}$, the value $e_o$ is given by the following equation:

$$e_o = \left(\frac{V_{max}}{k_2}\right)^2 \quad (10)$$

Now, let us assume that the vectors $\vec{p}$, $\vec{f}$ and $\vec{g}$ indicating the state of the hand at a time moment t have been calculated on the basis of the displacement values $\theta_1, \theta_2, \ldots, \theta_6$. Then, desired vectors $\vec{p_o}$, $\vec{f_o}$ and $\vec{g_o}$ at a time moment (t+T) are determined in the following manner.

The deviation e is first calculated by the equation (4) and the speed v is determined from FIG. 3 or 4. Thus, the amount of displacement of the hand at the time interval T is given by vT. When the hand is moved along a straight line to take the set state indicated by the vectors $\vec{p_f}$, $\vec{f_f}$ and $\vec{g_f}$, a vector $\vec{p_o}$ indicating the position of the hand at the time moment (t+T) is given by the following equation:

$$\vec{p_o} = vT(\vec{p_f} - \vec{p})/e + \vec{p} \quad (11)$$

On the other hand, the vectors $\vec{f}$ and $\vec{g}$ indicating the orientation of the hand 10 at the time moment t are changed finally to the vectors $\vec{f_f}$ and $\vec{g_f}$. This change in orientation can be made by rotating the hand 10 about a vector $\vec{d}$ through an angle $\vec{\rho}$. The vector d is determined as mentioned below.

(1) In the case of $\vec{f} = \vec{f_f}$ and $\vec{g} = \vec{g_f}$, $\vec{d} = 0$.
(2) In the case of $\vec{f} \neq \vec{f_f}$ and $\vec{g} = \vec{g_f}$, $\vec{d} = \vec{g}$.
(3) In the case of $\vec{f} = \vec{f_f}$ and $\vec{g} \neq \vec{g_f}$, $\vec{d} = \vec{f}$.
(4) In the case where a vector $(\vec{f} - \vec{f_f})$ is parallel to a vector $(\vec{g} - \vec{g_f})$, the vector d is given by the following equation:

$$\vec{d} = (\vec{f} - \vec{f_f}) \times (\vec{f} \times \vec{g})/|(\vec{f} - \vec{f_f}) \times (\vec{f} \times \vec{g})|.$$

(5) In other cases, the vector d is given by the following equation:

$$\vec{d} = (\vec{f} - \vec{f_f}) \times (\vec{g} - \vec{g_f})/|(\vec{f} - \vec{f_f}) \times (\vec{g} - \vec{g_f})|.$$

Further, the angle $\rho$ is given as follows:

$$\phi = 2 \tan^{-1} \frac{\vec{d} \cdot (\vec{f} \times \vec{f_f})}{\vec{f_f} \cdot \vec{f} - 2(\vec{d} \cdot \vec{f_f})^2 + 1}$$

$$= 2 \tan^{-1} \frac{\vec{d} \cdot (\vec{g} \times \vec{g_f})}{\vec{g_f} \cdot \vec{g} - 2(\vec{d} \cdot \vec{g_f})^2 + 1}$$

In order for the hand 10 to take the orientation indicated by the vectors $\vec{f_f}$ and $\vec{g_f}$ at the same time as the hand 10 reaches the set position given by the vector $\vec{p_f}$, the hand 10 has to be rotated about the vector $\vec{d}$ through an angle $\Delta\rho$ at the time interval T. The angle $\Delta\rho$ is given by the following equation:

$$\Delta\phi = \frac{vT\phi}{|\vec{p_f} - \vec{p}|} = \frac{vT\phi}{e}$$

Accordingly, the vectors $\vec{f_o}$ and $\vec{g_o}$ indicating a desired orientation of the hand 10 at the time moment (t+T) are given by the following equations:

$$\vec{f_o} = \cos \Delta\rho \vec{f} + (1 - \cos \Delta\rho)(\vec{d} \cdot \vec{f})\vec{d} + \sin \Delta\rho \vec{d} \times \vec{f}$$

$$\vec{g_o} = \cos \Delta\rho \vec{g} + (1 - \cos \Delta\rho)(\vec{d} \cdot \vec{g})\vec{d} + \sin \Delta\rho \vec{d} \times \vec{g}$$

When the vectors $\vec{p_o}$, $\vec{f_o}$ and $\vec{g_o}$ indicating the position and orientation of the hand 10 at the time moment (t+T) are determined as mentioned above, the displacement values $\theta_{oi}$'s of the kinematic pairs corresponding to the vectors $\vec{p_o}$, $\vec{f_o}$ and $\vec{g_o}$ are given as functions of the vectors $\vec{p_o}$, $\vec{f_o}$ and $\vec{g_o}$, that is, are expressed by the following equation:

$$\theta_{oi} = b_i(\vec{p_o}, \vec{f_o}, \vec{g_o})$$

where i indicates one of integers 1 to 6.

When the desired values $\theta_{oi}$'s of displacement of the kinematic pairs are thus determined, the kinematic pairs are controlled by the actuators 4a to 4f so as to have the desired values $\theta_{oi}$'s at the time moment (t+T).

Figure 5:
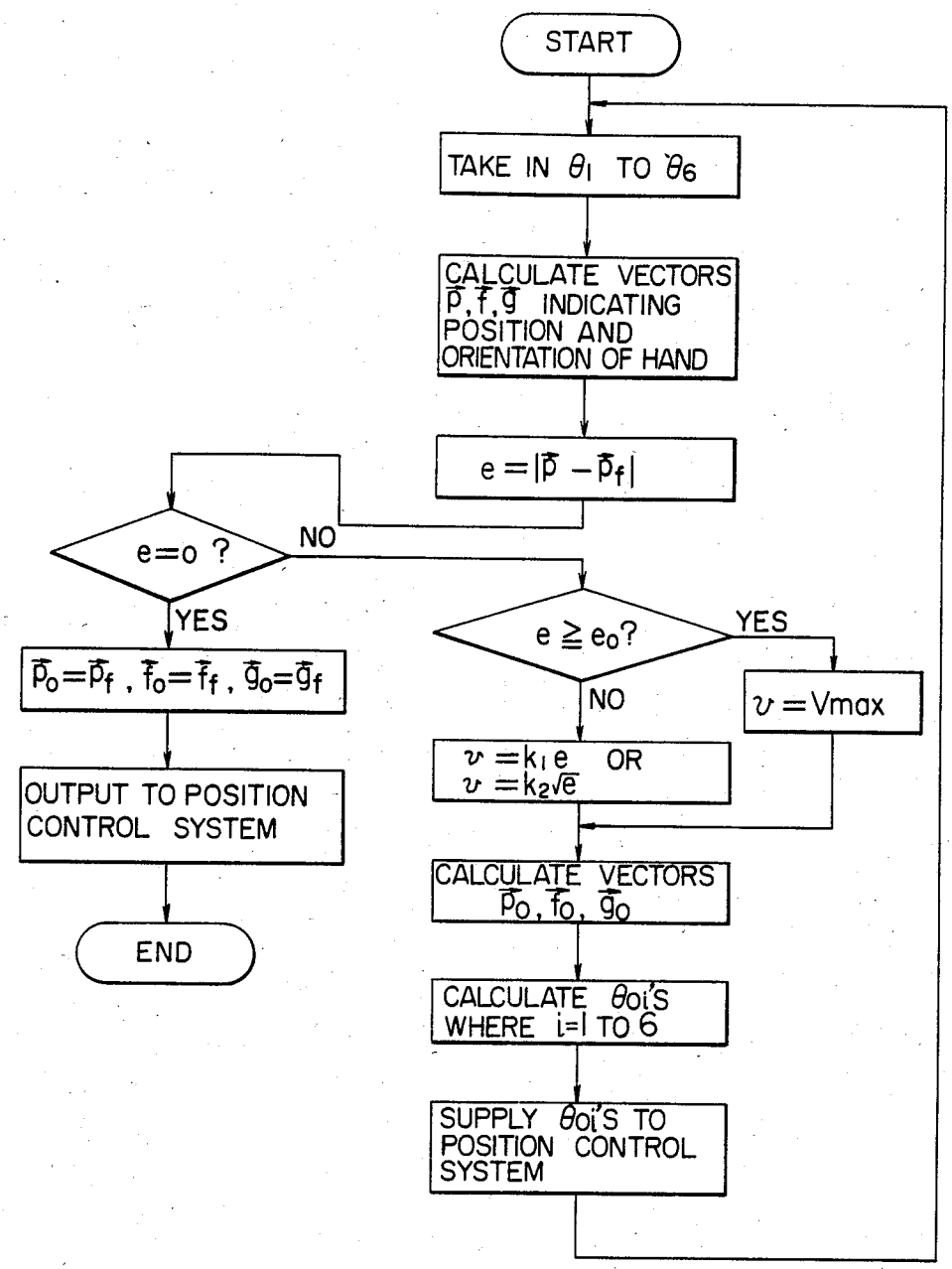
FIG. 5 is a flow chart for explaining a method of controlling a robot according to the present invention.

The above-mentioned control method can be expressed by a flowchart shown in FIG. 5.

In the above-mentioned explanation, a method of driving the hand 10 on the basis of the displacement of each kinematic pair has been shown. Alternatively, the hand 10 may be controlled on the basis of the speed of each kinematic pair.

When the speed v of the hand 10 is determined as shown in FIG. 3 or 4, the translational velocity vector $\vec{v}$ of the hand 10 is given by the following equation:

$$\vec{v} = \frac{v(\vec{p_f} - \vec{p})}{|\vec{p_f} - \vec{p}|}$$

On the other hand, the rotational velocity vector $\vec{\omega}$ is given by the following equation:

$$\vec{\omega} = \frac{v\phi}{|\vec{p_f} - \vec{p}|} \vec{d}$$

When the velocity vectors v and ω are thus determined, the translational and rotational angular velocity $\dot{\theta} = (\dot{\theta}_1, \dot{\theta}_2, \ldots, \dot{\theta}_6)^T$ of each kinematic pair is connected therewith as indicated by the following equation:

$$\begin{pmatrix} \vec{v} \\ \vec{\omega} \end{pmatrix} = J\dot{\theta}$$

where J indicates a Jacobian matrix.

Accordingly, the angular velocity $\dot{\theta}$ of each kinematic pair is given as follows:

$$\dot{\theta} = J^{-1} \begin{pmatrix} \vec{v} \\ \vec{\omega} \end{pmatrix}$$

Thus, the speed of each of the actuators 4a to 4f is controlled on the basis of the angular velocity $\dot{\theta}$. Such control is made through the aid of calculation performed by the robot control processor 1.

When the above-mentioned two methods are compared with each other, the method of controlling the hand in which the desired displacement of each kinematic pair is calculated, has an advantage that a servo amplifier for position control in a conventional numerical control device can be used in the servo system of the robot, but may be inapplicable to a robot having a special mechanism. On the other hand, the method of controlling the hand in which the speed of each kinematic pair is calculated, requires a large amount of calculation, but is applicable to any robot irrespective of the mechanism thereof.

Figure 6:
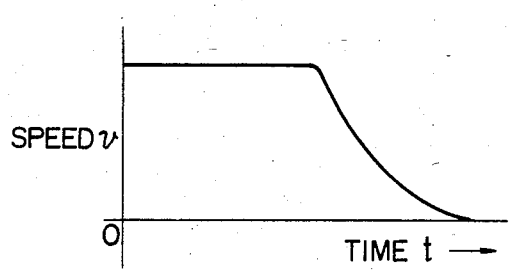
FIGS. 6 and 7 are graphs showing two kinds of changes in the speed of the hand of a robot which correspond to the relations shown in the FIGS. 3 and 4.
Figure 7:
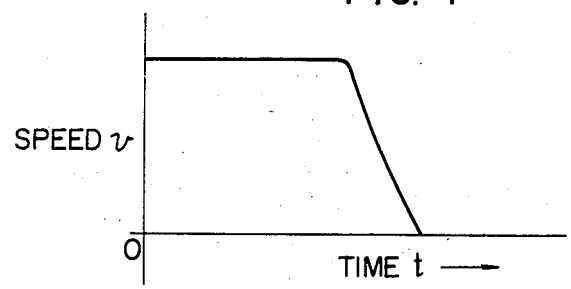

As has been explained in the foregoing description, according to the present invention, the speed of a hand is small as the hand goes nearer to a set position. That is, the hand is decelerated naturally. For example, in the case where the relation between deviation and speed shown in FIG. 3 is used, the speed of the hand decreases in accordance to a deceleration curve which is approximate to an exponential function, as shown in FIG. 6, and thus the hand can be placed smoothly at the set position. On the other hand, in the case where the relation between deviation and speed shown in FIG. 4 is used, the speed of hand is decreased with nearly constant deceleration as shown in FIG. 7, and thus the hand can be controlled rapidly. Further, since the velocity of the hand is set along the path thereof, the hand can be moved along a desired straight line. Furthermore, even when an error in the motion of the hand is caused by a disturbance, the hand can make a motion corresponding to the error, since the motion of the hand is determined on the basis of the present position of the hand and the set position. Additionally, even when the set position is changed in the source of motion of the hand, it is possible to accommodate a positioning operation to such a change.

We claim:

1. A method of controlling a robot, comprising the steps of:
   detecting the displacement of each of a plurality of kinematic pairs of a detector, said kinematic pairs being included in a robot;
   calculating the present spatial position of a hand of said robot on the basis of said detected displacement of each kinematic pair;
   calculating a deviation between said present position of said hand and a set position to be occupied by said hand;
   determining a speed of said hand in accordance with said deviation;
   calculating a desired intermediate position of said hand between said present position and said set position in dependence upon said speed of said hand if said hand moves from said present position at said speed after a predetermined time;
   calculating a desired displacement value for each of said kinematic pairs on the basis of said desired position of said hand; and
   controlling an actuator on the basis of the calculated displacement value for each of said kinematic pairs to drive each of said kinematic pairs.

2. A method of controlling a robot according to claim 1, wherein said speed of said hand is determined so as to be proportional to said deviation.

3. A method of controlling a robot according to claim 1, wherein said speed of said hand is determined so as to be proportional to the square root of said deviation.

4. The method of controlling the robot according to claim 1, wherein said step of calculating the present spatial position includes determining the present orientation of said hand and said step of calculating said desired position includes determining a set position orientation of said hand.

5. The method of controlling a robot according to claim 4, further comprising the steps of:
   determining a present position vector describing said present spatial position of said hand from coordinates of said present spatial position;
   determining a set position vector describing said set position to be occupied by said hand; and
   determining said deviation from the difference between said present position vector and said set position vector.

6. The method of controlling a robot according to claim 5, wherein the step of determining said speed of said hand comprises setting said speed at a maximum speed value if said deviation exceeds a preset quantity and setting said speed at a value less than said maxiumum speed value if said deviation is less than said preset quantity.

7. A method of controlling a robot according to claim 5, wherein said step of calculating the present spatial position includes:
   determining present position orientation vectors describing the orientation of said hand at said present position;
   determining set position orientation vectors describing the orientation of said hand at said set position; and determining a desired change in orientation of said hand on the basis of differences between said present orientation vectors and said set position orientation vectors.

8. A method of controlling a robot according to claim 7, further comprising the steps of:
  determining a rotational vector on the basis of said differences between said present orientation vectors and said set position orientation vectors;
  determining a rotational angle on the basis of said rotational vector, said present position orientation vector and said set position orientation vector; and
  calculating said desired displacement value on the basis of said speed of said hand, said present position vector, said deviation, said rotational vector, said rotational angle and said present position orientation vector.

9. A method of controlling a robot, comprising the steps of:
  detecting the displacement of each of a plurality of kinematic pairs by a detector, said kinematic pairs being included in a robot;
  calculating the present spatial position of a hand of said robot on the basis of said detected displacement of each kinematic pair;
  calculating a deviation between said present position of said hand and a set position to be occupied by said hand;
  determining a speed of said hand in accordance with said deviation;
  calculating a desired intermediate position of said hand between said present position and said set position in dependence upon said speed of said hand if said hand moves from said present position at said speed after a predetermined time;
  calculating a desired speed for each of said kinematic pairs on the basis of said desired position of said hand; and
  controlling an actuator on the basis of the calculated speed for each of said kinematic pairs to drive each of said kinematic pairs.

10. A method of controlling a robot according to claim 9, wherein said speed of said hand is determined so as to be proportional to said deviation.

11. A method of controlling a robot according to claim 9, wherein said speed of said hand is determined so as to be proportional to the square root of said deviation.

12. A method of controlling a robot according to claim 9, wherein said step of calculating the present spatial position includes determining the present orientation of said hand and said step of calculating said desired position includes determining a set position orientation of said hand.

13. The method of controlling a robot according to claim 12, further comprising the steps of:
  determining a present position vector describing said present spatial position of said hand from coordinates of said present spatial position;
  determining a set position vector describing said set position to be occupied by said hand; and
  determining said deviation from the difference between said present position vector and said set position vector.

14. The method of controlling a robot according to claim 13, wherein the step of determining said speed of said hand comprises setting said speed at a maximum speed value if said deviation exceeds a preset quantity and setting said speed at a value less than said maximum speed value if said deviation is less than said preset quantity.

15. A method of controlling a robot according to claim 14, wherein said step of calculating the present spatial position includes:
  determining present position orientation vectors describing the orientation of said hand at said present position;
  determining set position orientation vectors describing the orientation of said hand at said set position; and
  determining a desired change in orientation of said hand on the basis of differences between said present orientation vectors and said set position orientation vectors.

16. A method of controlling a robot according to claim 15, wherein the step of determining a desired speed for each of said kinematic pairs includes determining a translational velocity vector on the basis of said speed of said hand, said present position vector and said set position vector.

17. A method of controlling a robot according to claim 16, wherein the step of determining a desired speed for each of said kinematic pairs includes:
  determining a rotational vector on the basis of said differences between said present orientation vectors and said set position orientation vectors;
  determining a rotational angle on the basis of said rotational vector, said present position orientation vectors and said set position orientation vectors; and
  determining a rotational velocity vector on the basis of said speed of said hand, said deviation, said rotational vector and said rotational angle.

18. A method of controlling a robot according to claim 17, wherein said step of determining a desired speed for each of said kinematic pairs includes determining an angular velocity for each of said kinematic pairs from said translational velocity vector and said rotational velocity vector.

* * * * *